May 10, 1960  A. STACK  2,936,016
ANTI-SKID DEVICE
Filed Feb. 12, 1959
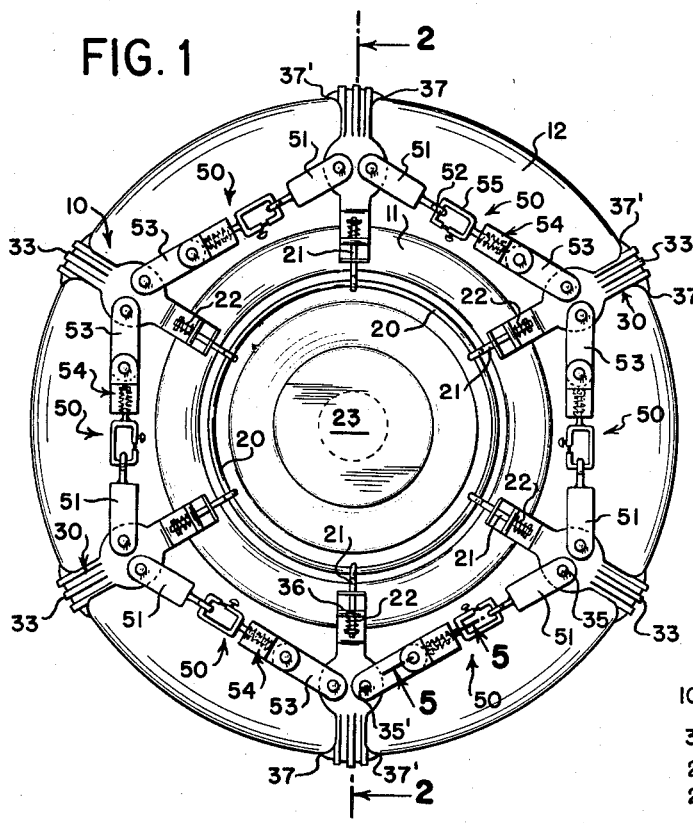
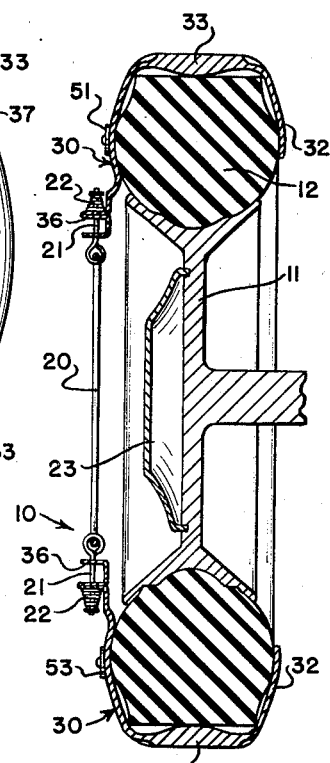
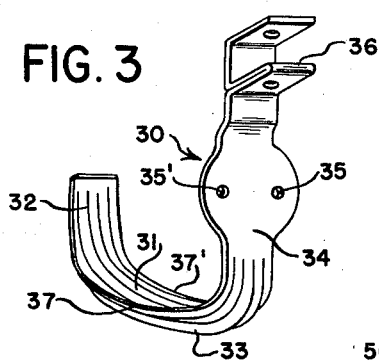
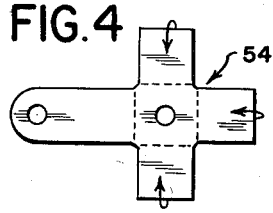
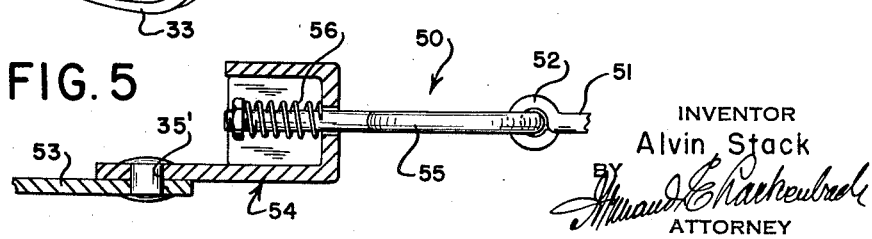
INVENTOR
Alvin Stack
BY
ATTORNEY United States Patent Office 2,936,016
Patented May 10, 1960

2,936,016

ANTI-SKID DEVICE

Alvin Stack, Levittown, N.Y.

Application February 12, 1959, Serial No. 792,785

3 Claims. (Cl. 152—217)

This invention relates to anti-skid devices and more particularly to a removable device for attachment to the wheels of a vehicle to prevent slipping and skidding of such vehicles in snow, ice, mud, soft ground, or the like. The invention is also applicable as a traction device applied to wheels of a vehicle when conditions of the roadway are such that the usual treads of a tire are ineffective in enabling a vehicle to move with certainty and efficiency.

The customary tire chain adapted to be fitted around the entire circumference of a tire, with cross chains extending across the tire treads, although providing generally good traction to a vehicle, requires locking, along the inner and outer circumferential surfaces of the tire. In order to engage such chains around a wheel, it is necessary that they be placed flat upon the ground, and that the vehicle be moved so that the wheels rest upon the cross chains, requiring the operator to assume a position underneath the vehicle to finally fasten the chains on the inner surface. Where the wheels cannot be moved, it becomes necessary to jack up the vehicle to place the chains thereunder. In cases where the vehicle is unfortunately mired in mud, soft ground, or snow, where the use of a jack is inexpedient, or a positive movement of the wheels is impossible, mounting such chains is rendered difficult, if not impossible. In the use of devices that require no jacking or moving of the vehicle, an operator is required to assume a prone position under the car so that visual contact is made with the inner face of a wheel and with the use of special tools can only then properly apply such device.

In the type of traction device generally consisting of a single traction band secured through spokes of the wheel and around the periphery of a tire at a single point, several operations are necessitated where more than one unit is desired to be attached. A severe limitation too, has been placed on the use of such band devices in cases where the space between spokes is too small to permit of its passage or in its use where vehicles utilize the disc type of wheel. In any event, they require the operator to reach around to the inner peripheral surface of the tire to thread the straps through the aforementioned spaces, a difficult and clothes-soiling procedure at best.

In either case however, such traction devices, once mounted on a wheel, serve their purpose well upon poor roads, but upon entry of a paved or otherwise unaffected surface, the use of such chains has caused damage to the road and to the device itself as well as to the body of the vehicle because of excessive vibration, extreme wear on the chain from contact with the dry surface, and the inherent lack of rigidity of chains around the tire, characteristic of such chain traction devices.

It is the object of this invention to provide a traction device which can be simply and easily mounted on and dismounted from a wheeled vehicle without the need of special tools while the vehicle remains in contact with the supporting surface, and without the operator concerning himself with any attachments on the inner surface of the tire.

Another object of the present invention is the provision of a traction device which can be applied to the wheels of a vehicle without necessitating lifting or moving the wheels of the vehicle in order to bring such wheels into proper alignment with the traction device for its final adjustment.

A further object of this invention is to provide a traction device held in a rigid form against the periphery of a tire with a yieldable adjustable force.

Another object of this invention is the provision of an anti-skid device which will afford increased traction in the direction of the normal movement of a vehicle and effectively function to prevent skidding or slipping of a vehicle on soft or slippery surfaces.

Another aim of this invention is to provide a traction device which will fit in a rigid form against the periphery of a tire when installed to prevent contact and/or damage with other parts of the vehicle or supporting surface of the vehicle.

Still a further object of this invention is the provision of a plurality of traction elements mounted on a common securing member which are individually removable from such securing member to allow for replacement upon wearing or damage to any such member.

A final object of this invention is the provision of a traction device which can be mounted on or dismounted from a tire by a single person simply and quickly by simple manipulations, immediately as the need for the device no longer exists.

In general, achievement of the foregoing objects and advantages is secured by the provision of a plurality of traction elements shaped to fit in rigid form around the periphery of the tire of a wheeled vehicle and integrally connected to a frame concentric with the hub cap of a wheel. Each of such traction elements are separably connected to each other by locking means which may be easily manipulated to release or secure each of said traction elements and in removing the entire assembly.

Other and further advantages and inventive characteristics of this new and unique structure will become apparent to those versed in the art from the following description of a particular embodiment of the invention as illustrated in the drawing; in which:

Fig. 1 is an elevational view of a traction device embodying the invention shown mounted upon a pneumatic tire;

Fig. 2 is a side elevational view of the same taken on the plane of line 2—2 of Fig. 1;

Fig. 3 is a perspective view of a traction element included in the embodiment as shown in Fig. 1;

Fig. 4 is a plan view of the housing for the connecting means of each of the traction elements; and Fig. 5 is an enlarged elevational view of the locking means of each of the traction elements and taken on the plane of line 5—5 of Fig. 1.

Referring now to the drawing in which similar reference characters identify similar parts in the several views, the anti-skid device 10 comprises a plurality of traction elements 30, six of which are shown in this embodiment but to which only one will be referred in describing the invention, mounted on a wheel 11 having a pneumatic tire 12, each of such traction elements 30 attached to a central ring 20 and secured to each other by locking means 50.

The traction element 30, a plurality of which may be used in the anti-skid device, generally assumes a J shape and is preferably formed of tempered steel, molded rubber, plastic or the like. The inner transverse surface 31 of the arcuate portion of the traction element 30 is adapted to fit transversely over the periphery of the tire 12 with the slightly convex lip portion 32 extending radially inward to fit over the inner peripheral face of the tire 12. Upon the outer transverse surface 33 of the arcuate portion of the traction element 30, a plurality of ridges or projections of any suitable shape to provide maximum traction, formed by pressing, stamping, or other means, serves as the gripping or friction surface thereof. Cleats, of any rigid material having a high tensile strength and affixed thereto, may also serve as gripping or friction surface. Gradually sloping in opposing directions from the apex of the transverse traction surface 33 are lips 37, 37' tapering in conformity with the general contour of a wheel. Such lips 37, 37' serve to eliminate jarring and undue vibration as the wheels, while in motion, gradually ascend and descend such traction element as it contacts a relatively firm surface. Disposed at the midsection of the long arm 34 of the traction element 30, holes 35 are provided to receive locking means presently to be described. Seated at the top portion of the long arm 34 of traction element 30, a U bracket section 36 formed as arm 34 is folded back upon itself, the apertures through the top of arm 34 and the aforementioned U section serving as guiding means for a rod 21, retained under pressure of a spring 22 sufficient to hold traction element 30 against the tire at relatively low speeds, and slidably secured to a solid ring 20 or other fastening means such as springs, or chains, concentric with the hub cap 23 of the wheel 12, which rod 21 fixes the path and retains each of the traction elements 11 while in travel or motion. When the speed of the wheel causes sufficient centrifugal force, to compress spring 22 completely, traction element 30 will then be at its maximum separation from the tire treads, whereas spring 22 will be completely expanded as it rests on a motionless tire. Further, as traction element 30 comes in contact with the ground, under pressure or centrifugal motion, traction element 30 will be taken up by the expansion of spring 22.

Alternately secured to either side of traction elements are locking means 50 comprising a relatively flat bar 51, one end which is affixed to traction element 30 at points 35, the opposite end of which terminates in a female coupling 52. A second bar 53 is secured to traction element at point 35' and has secured to its opposite end a housing 54 as seen in Fig. 4 prior to assembly containing a male coupling 55 complementary to and engageable with, female coupling 52, restrained by spring 56 and serving as the locking means for each of the traction elements. Such locking means are alternately secured to the sides of each traction element 30 so that after all of the couplings are locked, the traction elements are secured in position.

In the practice of the invention, the anti-skid device can be mounted upon the wheel of any vehicle whether with a pneumatic tire or not, while the wheel is in a stationary position, by merely clamping or clipping each traction element 11 upon the tire. Since each traction element is held under restraint, slight pressure is sufficient to expand each element to fit a tire of required size. After each of the elements are in place, the alternating locking arms connecting each are locked, causing a sturdy and stationary attachment therebetween.

In normal operation only one alternating locking arm connecting the traction elements need be opened or closed to mount or dismount the device. The dismounting is accomplished by unhooking the couplings, and by slight pressure each element is lifted from the perimeter of the tire.

From the foregoing, it is apparent that the present invention provides a device which can be easily mounted and dismounted upon the wheels of a vehicle by the operator without lifting or moving the vehicle; that special tools or skills are not a requirement for mounting or dismounting; that by reason of the locking means, each traction element is securely retained in its desired position without the possibility of moving or shifting to any other point; that by reason of its construction the traction element is securely held against the perimeter of the tire and therefore cannot damage or affect any other member of the vehicle and that by reason of its unique arrangement, is easily removable, and that no attention need be paid to the inner surface of the tire whatsoever.

Although the embodiment of this invention is shown mounted on a pneumatic tire, it is the ambient herein to use this device on all wheeled vehicles whether pneumatic or not, and that changes or modifications may be made herein without departing from the spirit of this invention.

I claim:

1. An anti-skid device for a wheel comprising a plurality of substantially J-shaped traction elements, each of said traction elements including an inwardly curved portion adapted to bear against the side wall of a wheel, a central embossed portion adapted to grip a stationary supporting surface, a rod vertically disposed adjacent the side of said traction element and restrained by a spring and slidably affixed to a common securing member concentric with the hub of said wheel and alternating arms attached to each side of said traction element, each of said arms having alternatingly engageable couplings.

2. An anti-skid device according to claim 1 wherein the transverse stationary supporting surface of the traction element has gradually sloping ascending and descending lips whereby a wheel can ride over said device relatively free of vibration.

3. An anti-skid device for a wheel comprising a plurality of substantially J-shaped radially disposed traction elements adapted to transversely embrace the outer periphery of a wheel; a solid ring concentric with the hub of said wheel; a plurality of spring-loaded rods each slidably affixed at one end thereof to said solid ring and at the opposite end thereof to said traction element whereby said traction elements are responsive to centrifugal force; a plurality of laterally extending arms pivotally affixed medially said traction elements; and a plurality of alternating spring-loaded male and female couplings laterally extending from said arms, said couplings being interengageable therebetween whereby said traction elements are responsive to alternating lateral forces.

References Cited in the file of this patent

UNITED STATES PATENTS

| 1,209,103 | Bachman et al. | Dec. 19, 1916 |
| 2,434,017 | Snedeker | Jan. 6, 1948 |
| 2,553,712 | Jensen | May 22, 1951 |
| 2,696,237 | Doughty | Dec. 7, 1954 |
| 2,743,755 | Fullerton | May 1, 1956 |